B. GRIGSBY & T. C. BRASELTON.
Coffee-Pots.
No. 135,544. Patented Feb. 4, 1873.
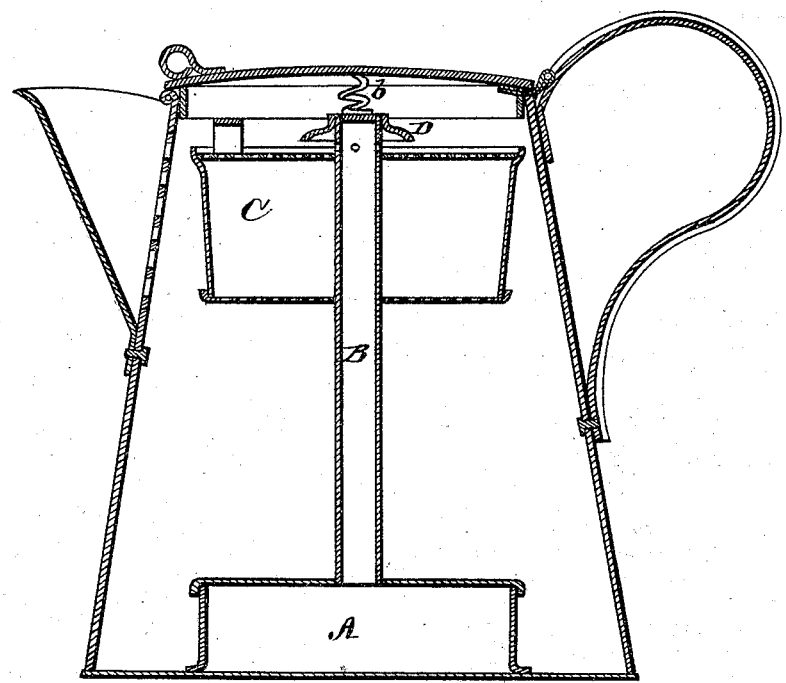
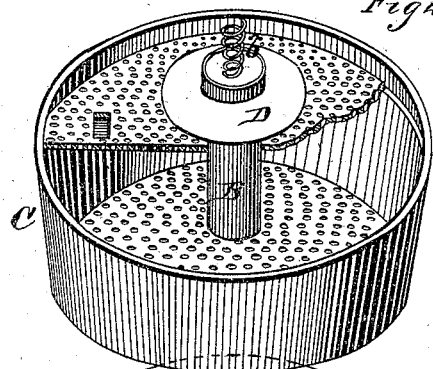
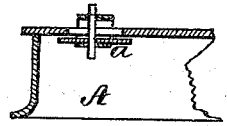
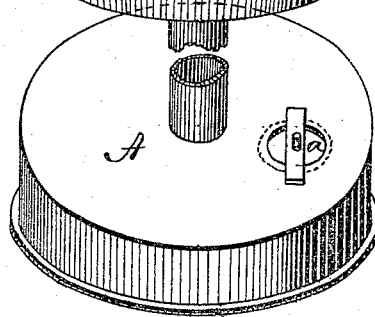
Witness:
F. L. Durand
C. L. Evert
Inventor.
Bayless Grigsby
Thos C. Braselton
per
Alexander Mason
Attorneys.

UNITED STATES PATENT OFFICE.

BAYLESS GRIGSBY AND THOMAS C. BRASELTON, OF PRINCETON, INDIANA.

IMPROVEMENT IN COFFEE-POTS.

Specification forming part of Letters Patent No. 135,544, dated February 4, 1873.

*To all whom it may concern:*

Be it known that we, BAYLESS GRIGSBY and THOMAS C. BRASELTON, of Princeton, in the county of Gibson and in the State of Indiana, have invented certain new and useful Improvements in Coffee-Pots; and do hereby declare that the following is a full, clear, and exact description thereof, reference being had to the accompanying drawing and to the letters of reference marked thereon making a part of this specification.

The nature of our invention consists in the construction and arrangement of an attachment for coffee-pots, as will be hereinafter more fully set forth.

In order to enable others skilled in the art to which our invention appertains to make and use the same, we will now proceed to describe its construction and operation, referring to the annexed drawing, in which—

Figure 1 is a vertical section of a coffee-pot with our attachment within the same. Fig. 2 is a perspective view of the attachment, and Fig. 3 is a section through a part of the same.

A represents a circular box, which is open at the bottom and rests with the open end down on the bottom of a coffee-pot. From the center of this box A rises a tube, B, which passes through and has attached to it another circular box, C. The bottom and top or lid of this box C are perforated, as shown, and the ground coffee is to be placed in said box while being boiled. The water is forced up through the pipe B, the upper end of which is closed and perforated around, so that the water and steam are forced through, and, passing down through the box C, extract the strength from the coffee. The water passes back into the lower box A through a valve, $a$, arranged in the top thereof for that purpose, as shown in Fig. 3. On the upper end of the pipe B is a spiral spring, $b$, to hold the attachment in its place and prevent it from rising too high in the coffee-pot when the lid is closed down. On the upper end of the pipe is also a cap, D, attached, which is concave on its under side, and is for the purpose of conducting the water which flows through the upright tube B into the box C containing the ground coffee and prevent the water from striking the sides of the coffee-pot.

Having thus fully described our invention, what we claim as new, and desire to secure by Letters Patent, is—

The combination, with a coffee-pot, of the bottomless box A with valve $a$, tube B closed and perforated at its upper part, cap D, spring $b$, and the box C with perforated top and bottom, all constructed and used substantially as set forth.

In testimony that we claim the foregoing we have hereunto set our hands this 6th day of December, 1872.

BAYLESS GRIGSBY.
THOMAS C. BRASELTON.

Witnesses:
 JAS. W. MUSGROVE,
 LEWIS PAGE.